UNITED STATES PATENT OFFICE.

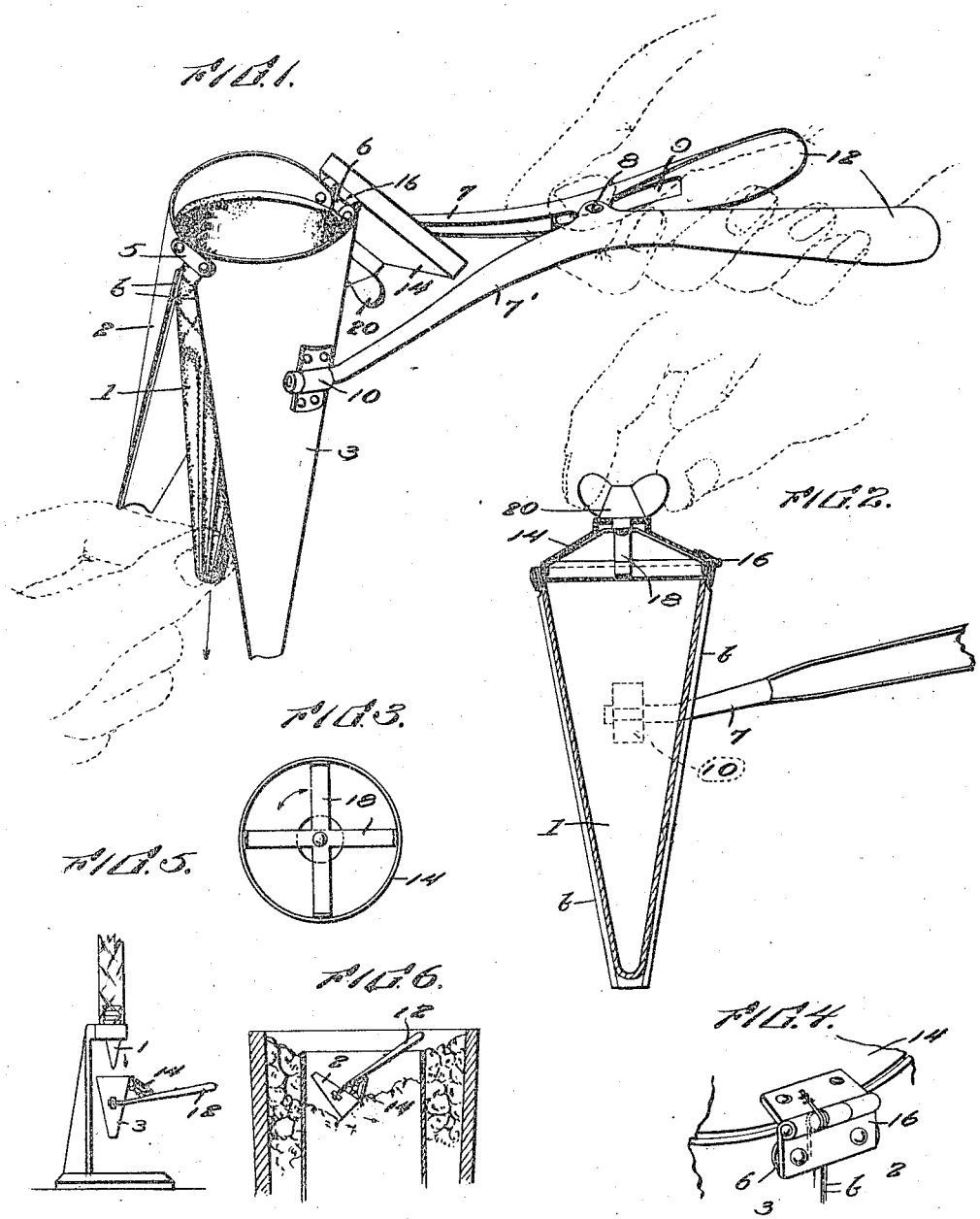

WILLIAM A. ROBINSON, OF OLD FORT, NORTH CAROLINA.

ICE-CREAM-CONE FILLER.

1,153,172.   Specification of Letters Patent.   Patented Sept. 7, 1915.

Application filed June 8, 1915. Serial No. 32,979.

*To all whom it may concern:*

Be it known that I, WILLIAM A. ROBINSON, a citizen of the United States, residing at Old Fort, in the county of McDowell and State of North Carolina, have invented certain new and useful Improvements in Ice-Cream-Cone Fillers, of which the following is a specification.

This invention relates to devices for filling ice cream cones and the main object of my invention is to provide an implement for handling the cones which will be easy to manipulate and will be perfectly sanitary.

The ordinary method of filling cones by holding the cone in one hand and filling it with a dipper or spoon held in the other hand, is very unsanitary. The implement which I have provided does not require the operator to touch the cone with his hands as it may be dropped into the filling device from a cone-holder, such as are now in common use in drug stores and ice cream parlors, the implements with the inclosed cone being dipped into the ice-cream freezer or container and then opened or separated by manipulating the handle so that the customer may remove the filled cone directly from the filling device.

In the accompanying drawings forming a part of this specification, Figure 1 is a perspective view of a cone filler embodying my invention and illustrating the manner in which the holding parts are separated to enable the customer to grasp the cone; Fig. 2 is a vertical section of the same; Fig. 3 is a bottom plan view of the cover and cream leveler; Fig. 4 is an enlarged detailed view showing the spring hinge by which the cover is attached; and Figs. 5 and 6 are illustrative views on a smaller scale showing respectively the manner in which the cone may be dropped into the filling device, and the manner in which the cream may be dipped from a freezer.

The filler comprises a conical receptacle or cone-holder having separable sections 2, 3, which are hingedly connected at the top by means of links 5, 6 and carried by the two-part handle or tongs consisting of the lever arms 7, 7' which are fulcrumed at 8 and normally pressed toward each other by the spring 9 acting against the gripping ends 12. The inner ends of the arms are swiveled in the straps 10 which are riveted or otherwise secured to the sides of the receptacle. The links 5 and 6 are preferably secured rigidly to one section of the receptacle and loosely pivoted to the other section, the fast and loose connections of the two links being preferably oppositely arranged. This construction permits the spring 9, acting through the arms 7, 7', to normally hold the filler sections 2, 3 tightly together so that they will form a conical chamber conforming to the cone shape of an ordinary ice cream cone, but permitting the centers to be instantly separated, as indicated in Fig. 1 by pressure of the operator's hand upon the gripping members 12.

I secure a cover or cap 14, preferably conical in shape, to the link 6, by means of a spring hinge 16 which normally holds the cover open and yieldingly thrown outward and back against the handle in the position indicated in Fig. 1. Cutting blades 18 conforming to the interior of the cover are riveted to the inner end of the stem of a thumb piece 20, passing through the top of the cover so that the cutters may be rotated by turning the thumb piece with the fingers, in the manner indicated in Fig. 2.

The manipulation of this cone filler will be readily understood from the foregoing detailed description of the construction. A cone is first inserted in the filler receptacle, preferably dropped therein from one of the sanitary cone delivery holders, as illustrated in Fig. 5. The sections 2, 3, are preferably made longer than the cone 1, as illustrated in Figs. 2 and 3, thereby leaving a space above so that the cover 14 may fit into the top of the receptacle, in the manner illustrated in Fig. 2 after the cone has been filled. While it is not necessary that the cone should be actually grasped by the sections, 2, 3, this may be effected if desired, by slightly separating the sections as the cone is dropped therein. The longitudinal meeting edges of the cone sections are preferably flared outwardly as indicated at *b*, so that there will be no danger of one edge passing inside of the other to thereby endanger the integrity of the cone.

The filler is then dipped by means of a handle into the ice cream freezer or other container in the manner illustrated in Fig. 6. The upper metal edges of the sections 2, 3, which project above the top of the cone 1, readily cut into the top of ice cream, so that the cone is filled with the same facility as the ordinary mold or dipper. As the filler is removed from the freezer, the top 14 is grasped in the other hand and turned over into the position shown in Fig. 2, the thumb piece 20 being at the same time turned between the fingers to rotate the cutters 18 and thereby round the top of the cream over the cone into a smooth attractive shape. Upon releasing the grasp on the cover, the spring hinge throws it back again into the position shown in Fig. 1. The gripping members 12 are then pressed together to open the sections and permit the customer to grasp the lower end of the cone and remove it from the holder in the manner illustrated in Fig. 1.

The advantages resulting from the use of my combined cone holder and filler which prevents any danger of contamination from the hands of the operator will be appreciated by all who are familiar with the usual method of filling ice cream cones. While I have described in detail the particular construction shown in the accompanying drawings for the purpose of illustrating an embodiment of my invention, I am aware that various changes may be made therein within the scope of my claims and without departing from the spirit and purpose of my invention.

I claim:—

1. An ice-cream cone filler, comprising a two-part holder adapted to receive a cone, and having semi-conical sections pivotally connected at the larger ends, a molding cover pivotally secured to one of said sections, and a handle having lever-arms secured to said sections.

2. An ice-cream cone filler, comprising a two-part holder adapted to receive a cone, said holder having semi-conical sections pivotally connected at the larger ends upon opposite sides, a molding cover pivoted to the larger end of the holder, a cutting member secured to the cover, means for actuating said member, and a handle having fulcrumed lever-arms pivotally connected respectively to said sections.

3. An ice-cream cone filler, comprising a two-part holder adapted to receive a cone, said holder having semi-conical sections pivotally connected at the larger ends upon opposite sides, a molding cover pivoted to the larger end of said holder and normally yieldingly held at one side thereof, a cutting member rotarily mounted within the inclosure of said cover, and an actuating member rotarily secured upon the outer side of the cover and having a stem passing therethrough and secured to said cutting member.

4. An ice-cream cone filler, comprising a two-part holder adapted to receive a cone, and having semi-conical sections, links pivotally connecting the larger ends of said sections upon opposite sides, a molding cover pivotally secured to one of said links, and a handle having fulcrumed lever-arms pivotally connected to the sides of said sections.

In testimony whereof I affix my signature in presence of two witnesses.

WILLIAM A. ROBINSON.

Witnesses:
J. N. NESBITT,
C. L. GILBERT.